Figure 1:
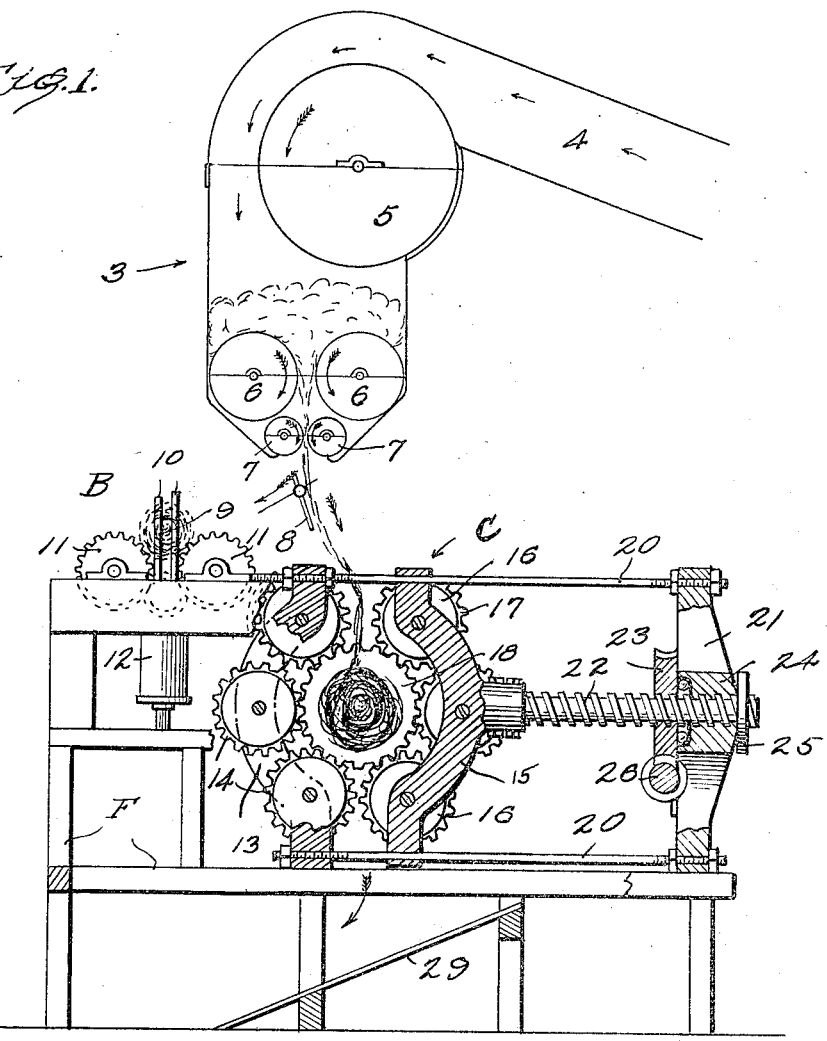

Oct. 7, 1924.
S. H. DUNLAP
1,510,885
ROUND BALE GIN COMPRESS
Filed June 28, 1920      2 Sheets-Sheet 2
Fig. 2.
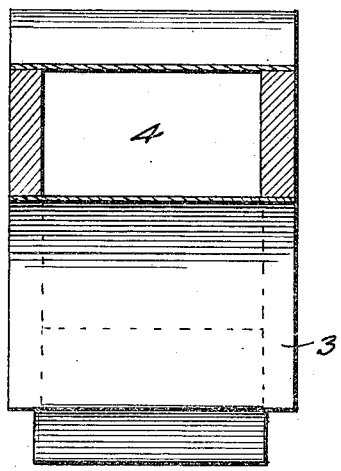
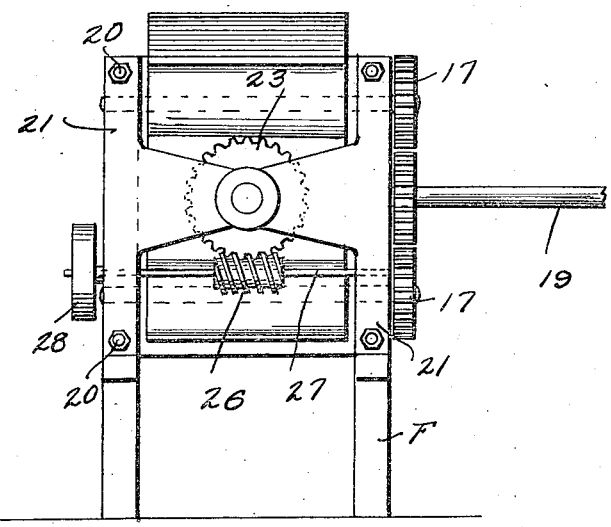
Samuel H Dunlap INVENTOR.
Witnesses
BY
Richard B. Owen ATTORNEY.

Patented Oct. 7, 1924.

1,510,885

UNITED STATES PATENT OFFICE.

SAMUEL H. DUNLAP, OF ENNIS, TEXAS.

ROUND-BALE GIN COMPRESS.

Application filed June 28, 1920. Serial No. 392,190.

*To all whom it may concern:*

Be it known that I, SAMUEL H. DUNLAP, a citizen of the United States, residing at Ennis, in the county of Ellis and State of Texas, have invented certain new and useful Improvements in Round-Bale Gin Compresses, of which the following is a specification.

This invention relates to round-bale gin compresses, the primary object of the invention being to form a round bale by first forming the same on a core to insure required density at the center of the bale and then finishing the bale without the core in a cage-type press to insure the required uniform size demanded by railroads and steam ship lines whereby a bale of non-elasticity or non-expansiveness is provided, one which possesses the maximum density and is of uniform size, and one wherein crumpling of the fibre is eliminated.

It has been the practice in bailing cotton, to either form the bale entirely without a core in a cage-type press, starting and finishing the bale without the use of a core; or by starting and finishing the bale on a core and compressing the fibre during the entire baling operation. These methods have proven objectionable for the reason that in the first mentioned method the bale is started with a loose center and as it increases in size and density, the cotton is gradually crumpled up due to the loose center and air is imprisoned on the interior of the bale, thus rendering the same elastic or expansive and also causing the fibre to become crumpled and damaged. In the latter method wherein the bale is formed entirely upon a core, it is practically impossible to form the bales with either the required uniform density or the required uniform size, the uniform size being essential for the advantages that should accrue to a gin compressed bale. After the bale has been formed upon a core, the latter is removed and therefore the objectionable loose center of the bale will exist. Further, by finishing the bale upon a core, it is almost impossible to make all bales of uniform size, it not being practical to increase the density of the core formed bale without placing it under pressure from entirely around the outside, so as to accomplish uniformity of size and density, without crumpling the fibre. It is therefore for the above reasons that I have provided means for starting the bale with a core and finishing the same without the core.

Another object of the invention is to provide an arrangement whereby the cotton baling device is arranged in close proximity to the mechanism for starting the bale and also the mechanism for finishing the bale.

Still another object of the invention is to provide a cage type press embodying a pair of roller carriers, one of which is movable relative to the other and is releasably retained in a predetermined set position in order that all bales formed by the press will be of uniform size. Means are also provided for moving the movable roller carrier so as to permit of the finished bale dropping through the press, whereby a new bale may be started in the press without the loss of time.

Other objects and advantages of the invention will become apparent during the course of the following description.

In the accompanying drawings forming a part of the application and wherein like numerals are employed to designate like parts throughout the several views, Figure 1 is a side elevation of the invention, parts thereof being broken away, Figure 2 is an end elevation of the frame.

Referring to the drawings wherein for the purpose of illustration I have shown the preferred embodiment of my invention, the numeral 3 indicates a bat-former having an inlet 4 for receiving cotton from the gin. A feed drum 5 is mounted in the upper end of the bat former and in the lower end thereof is provided a pair of spaced bat forming relatively large rolls 6 between which the lint or cotton is adapted to be packed into the bat. Directly under these bat forming rolls 6 is a second pair of bat forming rolls 7 disposed in close proximity to one another so that the bat passing therethrough is compressed further after which it is directed to a pivotally mounted lint-slide 8. The bat is directed by the lint slide to either the press B or the cage press C.

As I intend using my present improvements in conjunction with the compress as shown and described in my Letters Patent No. 1,087,002 issued Feb. 10th, 1914, reference will be made thereto, especially as concerns the two presses A and B therein mentioned. The presses disclosed in my above named patent are adapted for use in forming bales upon cores and as one step in my recent improvements contemplates the use of a press for starting a bale upon a core, I will briefly outline the operation of the same in the present application.

A core 9 of the type which may be readily removed from the formed bale is used, and is positioned between guide ways 10. The lint slide 8 is shifted to the position shown in dotted lines so that the bat formed will be directed toward the core 9. After the bat has been started thereon, the rollers 11 are rotated in the manner set forth in my above named patent to compress the cotton upon the core as the bale is rotated in order that the necessary density of the center of the bale may be obtained. As the bale increases in size, it has a tendency to move vertically of the guide ways 10, but this movement is resisted to a certain extent by a fluid controlled resistance device 12, the operation of which is clearly set forth in my mentioned patent. In the above manner, the bale may be started and the required density will be present therein and crumpling of the fibre will be eliminated.

The press B is mounted upon a suitable frame work F adjacent the cage type press C. This cage type press consists of a stationary roller carrier 13 of bowed configuration having bale forming rollers 14 journaled therein in horizontal planes so as to form one arcuate wall of a bale forming chamber. The cooperating roller carrier 15 is movable relative to its coacting roller carrier and is provided with the bale forming rollers 16 which are arranged in the same position as are the rollers of the coacting carrier 13. These rollers 16 form the opposite curved wall of the bale chamber, and each roller is equipped with a gear 17 which is adapted to mesh with a driving gear 18 carried by a power shaft 19. As shown all of the rollers of one side of the bale chamber rotate in the same direction, while the rollers of the opposite side of the bale chamber rotate in the opposite direction. In other words, the rollers 14 of the carrier 13 rotate inwardly and downwardly of the chamber, while the rollers of the cooperating carrier rotate inwardly and upwardly of the chamber. In this manner, the bale is continuously rotated while the cotton is being wound and compressed thereon.

The movable roller carrier 15 is longitudinally slidable of the frame F upon guide rods 20, corresponding ends of which are secured to the stationary carrier 13. The opposite ends of the guide rods 20 are secured to uprights 21 at the end of the frame. A screw 22 is carried by the movable roller carrier 15 and is threaded through a worm wheel 23 and transversely extending braces 24 of the uprights 21. The worm wheel 23 is provided with a hub as shown in Figure 1 which fits in a recess in the braces 24 and is held therein against displacement by any suitable means. A nut 25 is positioned upon the outermost end of the screw and abuts with the braces 24 to govern the inward movement of the movable carrier 15. Movement of the worm wheel to move the carrier 15 is obtained through the worm 26 carried by a transversely extending shaft 27, which may be operated by a hand wheel 28 secured to the end thereof.

Assuming that the bale has been started by the press B it is removed from the guide ways 10 and positioned in the cage-press C. The lint slide 8 is swung to the full line position shown in Figure 1 so that the cotton may be properly directed from the bat former to the bale which is in the press C. The hand wheel 28 is then operated to cause the movable carrier to move to a predetermined cooperative relation with the stationary carrier 13 after which the core of the bale is removed. The power shaft 19 is then rotated which through its gear 18 causes the rollers 14 and 16 to rotate in the manner above set forth. The cotton is then fed in between the two uppermost rollers of the cooperating carriers and as the bale enlarges, it contacts with the rollers 14 and 16. As these rollers are relatively stationary, they exert an inward pressure upon the bale being formed and consequently the open center of the bale, left by the removal of the core, is gradually filled compactly. Continued rotation of the bale causes the cotton to become compressed thereon until the desired size of bale has been obtained and one which possesses the required density. The cotton from the bat former is severed and is then directed onto the core 9 awaiting in the guide ways 10 whereby the next bale is started, while the formed bale is being removed. The bale in the press C is rotated until the necessary wrapping material has been wound therearound. Movement of the rollers is then stopped so as to permit temporary fastening of the wrapping around the bale. The movable carrier 15 is then retracted from its stationary carrier so as to permit the bale to drop by gravity through the frame and upon the inclined platform 29 whereby it is caused to roll away from the presses to have the wrapping permanently secured thereto. In the meantime, the new bale is about ready for entrance into the press C therefore it will be manifest that a continuous operation is provided for so that the bales may be formed in a minimum amount of time.

The foregoing description and the accompanying drawings have reference to the preferred embodiment of my invention. It is to be understood however that such charges in combination and arrangement of parts, materials, dimensions, etc., may be made as may prove expedient and fall within the scope of the appended claim.

Having thus described my invention what I claim as new and desire to secure by Letters Patent is:—

In combination with a cage press, a bale starting mechanism comprising a core adapted to wind a partially formed bale thereon, and a bat slide adapted to guide the bat of cotton either on the core or in said cage press, whereby when the partially formed bale is removed from the core of the bale starting mechanism and placed in the cage press, said bat slide will guide the bat of cotton into the cage press to completely form the bale in said cage press and be compressed therein while being formed.

In testimony whereof I affix my signature in presence of two witnesses.

SAMUEL H. DUNLAP.

Witnesses:
MARY M. DUGGAN,
LUCILE GRIFFIN.